United States Patent
Jin

(12) 
(10) Patent No.: US 11,062,420 B2
(45) Date of Patent: Jul. 13, 2021

(54) GRAPHICS PROCESSING UNIT, GRAPHICS PROCESSING SYSTEM, AND GRAPHICS PROCESSING METHOD OF PERFORMING INTERPOLATION IN DEFERRED SHADING

(71) Applicant: SAMSUNG ELECTRONICS CO., LTD., Suwon-si (KR)

(72) Inventor: Seung-hun Jin, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/519,542

(22) Filed: Jul. 23, 2019

(65) Prior Publication Data

US 2020/0143507 A1    May 7, 2020

(30) Foreign Application Priority Data

Nov. 5, 2018 (KR) .......................... 10-2018-0134442

(51) Int. Cl.
| | |
|---|---|
| *G09G 5/02* | (2006.01) |
| *G06T 1/20* | (2006.01) |
| *G06T 11/40* | (2006.01) |
| *G06T 7/13* | (2017.01) |
| *G06T 15/80* | (2011.01) |

(52) U.S. Cl.
CPC ............... *G06T 1/20* (2013.01); *G06T 7/13* (2017.01); *G06T 11/40* (2013.01); *G06T 15/80* (2013.01)

(58) Field of Classification Search
CPC ..... G06T 1/20; G06T 15/005; G06T 15/80–87
See application file for complete search history.

(56) References Cited

U.S. PATENT DOCUMENTS

| | | | |
|---|---|---|---|
| 5,977,977 A | 11/1999 | Kajiya et al. | |
| 6,229,553 B1 | 5/2001 | Duluk, Jr. et al. | |
| 7,170,515 B1 | 1/2007 | Zhu | |
| 9,652,882 B2 | 5/2017 | Cerny | |
| 2003/0034976 A1* | 2/2003 | Raskar | G06T 15/005 345/427 |
| 2010/0079471 A1* | 4/2010 | Airey | G06T 1/20 345/519 |
| 2013/0063440 A1 | 3/2013 | Son et al. | |
| 2013/0265307 A1 | 10/2013 | Goel et al. | |
| 2014/0176549 A1* | 6/2014 | Uralsky | G06T 15/005 345/426 |
| 2014/0327684 A1* | 11/2014 | Engh-Halstvedt | G06T 1/20 345/506 |
| 2014/0354627 A1* | 12/2014 | Pinkerton | G06T 15/50 345/419 |
| 2015/0193968 A1* | 7/2015 | Barringer | G06T 15/60 345/420 |
| 2016/0042491 A1 | 2/2016 | Croxford et al. | |

(Continued)

*Primary Examiner* — Charles Tseng
(74) *Attorney, Agent, or Firm* — Lee IP Law, PC

(57) ABSTRACT

A graphics processing system includes a graphics processor, the graphics processor generating a G-buffer (geometry-buffer) by performing a first pass of deferred shading; and a memory storing the G-buffer, wherein the graphics processor includes: a map manager to generate a first fragment map indicating fragments to be shaded and generate a second fragment map by adding or removing fragments to or from the first fragment map based on the G-buffer; and a shades to shade fragments according to the second fragment map.

18 Claims, 16 Drawing Sheets

(56) References Cited

U.S. PATENT DOCUMENTS

| | | | |
|---|---|---|---|
| 2017/0132830 A1* | 5/2017 | Ha | G06T 17/20 |
| 2017/0148203 A1 | 5/2017 | Hakura et al. | |
| 2018/0268604 A1* | 9/2018 | Story | G06T 3/4007 |
| 2019/0005704 A1* | 1/2019 | Howson | G06T 1/20 |
| 2019/0206121 A1 | 7/2019 | Jin | |

* cited by examiner

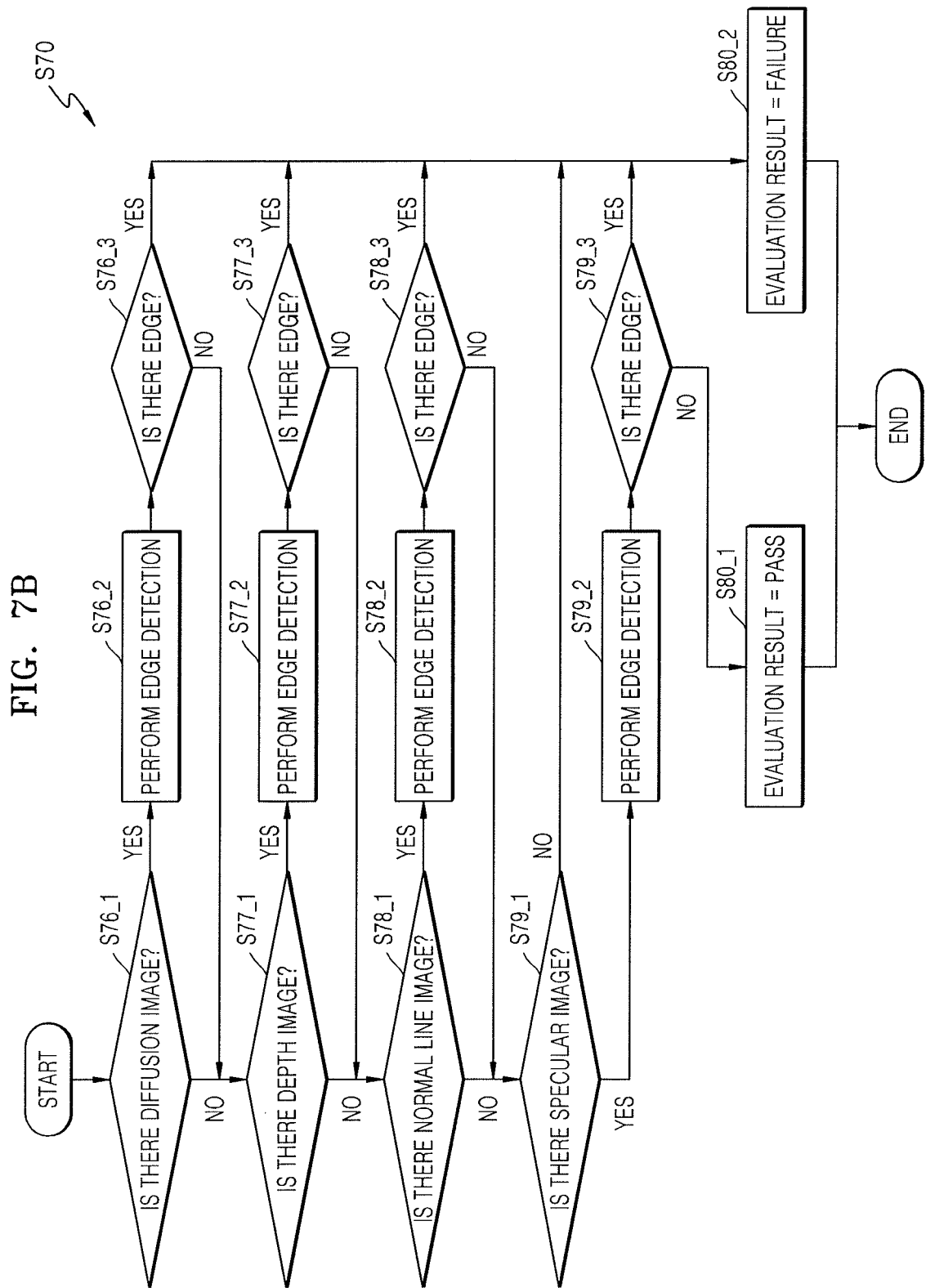

GRAPHICS PROCESSING UNIT, GRAPHICS PROCESSING SYSTEM, AND GRAPHICS PROCESSING METHOD OF PERFORMING INTERPOLATION IN DEFERRED SHADING

CROSS-REFERENCE TO RELATED APPLICATION

Korean Patent Application No. 10-2018-0134442, filed on Nov. 5, 2018, in the Korean Intellectual Property Office, and entitled: "Graphics Processing Unit, Graphics Processing System, and Graphics Processing Method of Performing Interpolation in Deferred Shading," is incorporated by reference herein in its entirety.

BACKGROUND

1. Field

Embodiments relate to graphics processing, and more particularly, to a graphics processing unit, a graphics processing system, and a graphics processing method, in which interpolation is performed in deferred shading.

2. Description of the Related Art

Rendering may refer to a process of generating an image from a three-dimensional (3D) model or a two-dimensional (2D) model, from a given view point. As the demand for computer graphics has increased, a graphics processing system may be used as exclusive hardware for accelerating rendering, and a rendering process in a computing system including a graphics processing system may be referred to as a graphics pipeline.

Fragment shading, which is one of the operations in a graphics pipeline, may require a large amount of computing resources. To reduce computing resources consumed in fragment shading, a fragment may be selectively shaded and an unshaded fragment may be interpolated from shaded peripheral fragments. Accordingly, final image quality according to interpolation may be determined by an interpolation input, i.e., shaded fragments.

SUMMARY

According to an aspect, there is provided a graphics processing system including: a graphics processor, the graphics processor generating a G-buffer (geometry-buffer) by performing a first pass of deferred shading; and a memory storing the G-buffer, wherein the graphics processor includes: a map manager to generate a first fragment map indicating fragments to be shaded and generate a second fragment map by adding or removing fragments to or from the first fragment map based on the G-buffer; and a shader to shade fragments according to the second fragment map.

According to another aspect, there is provided a graphics processing system including: a graphics processor, the graphics processor generating a G-buffer (geometry-buffer) by performing a first pass of deferred shading; and a memory storing the G-buffer, wherein the graphics processor includes: a shader to generate intermediate rendering data by shading fragments according to a fragment map indicating fragments to be shaded and generate final rendering data by selectively shading fragments based on the G-buffer; and an interpolation filter to generate a final image, including shaded pixels, by interpolating shading for unshaded pixels based on shaded pixels adjacent thereto in the intermediate rendering data and the final rendering data.

According to another aspect, there is provided a graphics processing system including: a graphics processor, the graphics processor generating a G-buffer (geometry-buffer) by performing a first pass of deferred shading; and a memory storing the G-buffer, wherein the graphics processor includes a shader to generate intermediate rendering data by shading fragments according to a fragment map indicating fragments to be shaded and generate a final image by providing the intermediate rendering data and the G-buffer stored in the memory to an artificial neural network trained to output a final image from an image of the G-buffer and an image of the intermediate rendering data.

According to another aspect, there is provided a graphics processing method including: generating a G-buffer (geometry-buffer) by performing a first pass of deferred shading; generating intermediate rendering data by performing rendering according to an initial fragment map indicating fragments to be shaded; determining fragments to be interpolated based on the G-buffer and the intermediate rendering data as unshaded fragments; and interpolating unshaded fragments based on adjacent shaded fragments.

According to another aspect, there is provided a graphics processing method including: generating a G-buffer (geometry-buffer) by performing a first pass of deferred shading; generating intermediate rendering data by performing rendering according to an initial fragment map indicating fragments to be shaded; and providing the intermediate rendering data and the G-buffer to an artificial neural network, wherein the artificial neural network is trained to output a final image from an image of the G-buffer and an image of the intermediate rendering data.

BRIEF DESCRIPTION OF THE DRAWINGS

Features will become apparent to those of skill in the art by describing in detail exemplary embodiments with reference to the attached drawings in which:

FIGS. 7A and 7B illustrate flowcharts of a method of generating a second fragment map, according to an embodiment;

DETAILED DESCRIPTION

Figure 1:
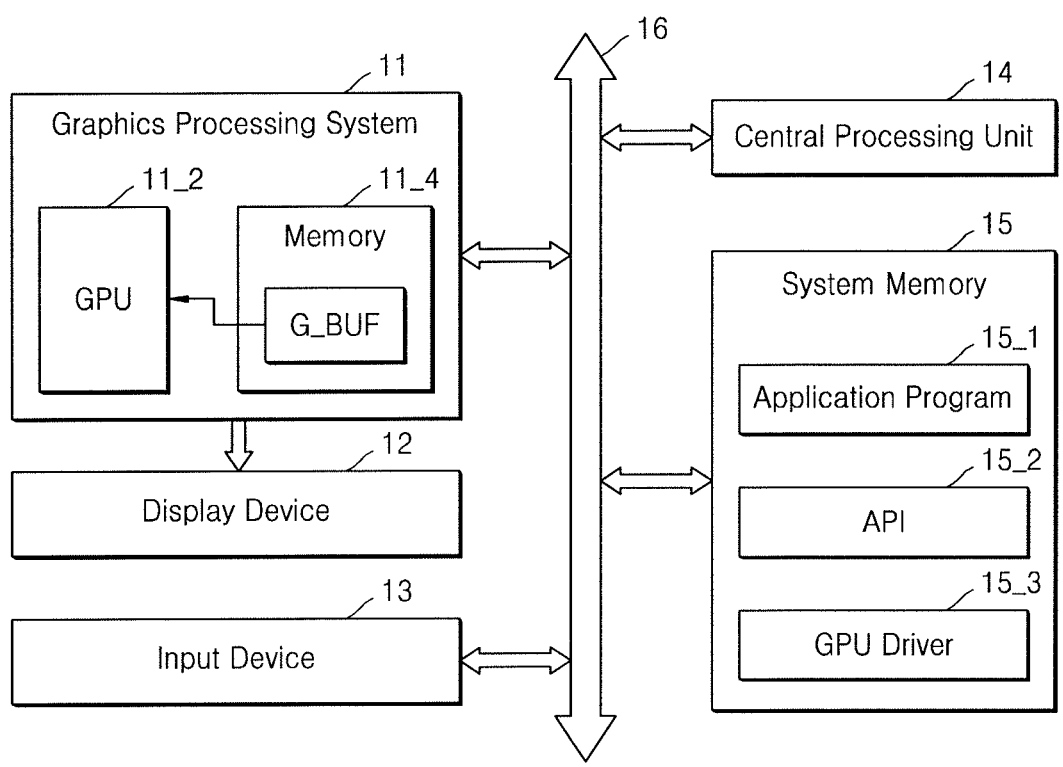
FIG. 1 illustrates a computing system according to an embodiment.

FIG. 1 illustrates a computing system 10 according to an embodiment. The computing system 10 may refer to an arbitrary computing system that includes a graphics processing system 11. The computing system 10 may be, without limitation, a stationary-type computing system such as a desktop computer, a server, a television set-top box, a video game console, or a portable computing system such as a laptop computer, a mobile phone, a wearable device, a portable media player, a tablet personal computer (PC), an e-book reader, or the like.

As illustrated in FIG. 1, the computing system 10 may include the graphics processing system 11, a display device 12, an input device 13, a central processing unit (CPU) 14, a system memory 15, and a system bus 16. In some embodiments, two or more components included in the computing system 10, e.g., two or more from among the graphics processing system 11, the CPU 14, and the system bus 16 may be integrated in a single processing system. The system bus 16 may connect the graphics processing system 11, the input device 13, the CPU 14, and the system memory 15 as illustrated in FIG. 1. The graphics processing system 11, the input device 13, the CPU 14, and the system memory 15 may communicate with each other via the system bus 16. In some embodiments, the system memory 15 may be directly connected to the CPU 14.

The CPU 14 may receive a user input via the input device 13. In addition, the CPU 14 may execute a series of instructions (or a program) stored in the system memory 15, and process data stored in the system memory 15, or direct the graphics processing system 11 to perform a particular job in a graphics pipeline. In some embodiments, the CPU 14 may include two or more cores.

The system memory 15 may store instructions and data to be processed by the CPU 14 and the graphics processing system 11. The system memory 15 may include an arbitrary type of memory storing information. For example, in some embodiments, the system memory 15 may include a volatile memory, e.g., Dynamic Random Access Memory (DRAM), Static Random Access Memory (SRAM), mobile DRAM, Double Data Rate Synchronous Dynamic Random Access Memory (DDR SDRAM), Low Power DDR (LPDDR) SDRAM, Graphics DDR (GDDR) SDRAM, Rambus Dynamic Random Access Memory (RDRAM), or the like, or may include, in some embodiments, a nonvolatile memory, e.g., Electrically Erasable Programmable Read-Only Memory) (EEPROM), a flash memory. Phase Change Random Access Memory (PRAM), Resistance Random Access Memory (RRAM), Nano Floating Gate Memory (NFGM), Polymer Random Access Memory (PoRAM), Magnetic Random Access Memory (MRAM), Ferroelectric Random Access Memory (FRAM), or the like.

As illustrated in FIG. 1, the system memory 15 may include an application program 15_1, an application program interface (API) 15_2, and a GPU driver 15_3. The application program 15_1 may generate calls with respect to the API 15_2 to generate desired results in the form of, for example, a sequence of graphics images. In addition, the application program 15_1 may provide high-level shading programs to be processed by the GPU driver 15_3, to the API 15_2. The high-level shading programs may include source codes of high-level programming instructions designed to operate at least one shading engine (or a shader) (for example, a shader 52_4 of FIG. 5) in the graphics processing system 11. In some embodiments, the API 15_2 may be implemented inside the GPU driver 15_3. The GPU driver 15_3 may translate high-level shading programs to machine code shading programs that are optimized for a type of a shading engine (e.g., a vertex, geometry, a fragment, and the like).

The graphics processing system 11 may receive instructions provided by the CPU 14 and may process the received instructions to render the images and display the images on the display device 12. As illustrated in FIG. 1, the graphics processing system 11 may include a graphics processing unit 11_2 and a memory 11_4 and may be referred to as a graphics subsystem. The graphics processing unit 11_2 and the memory 11_4 may be connected to each other via a bus (for example, a GPU bus). The graphics processing unit 11_2 may store, in the memory 11_4, data that is generated while processing instructions received from the CPU 14 and may display final images stored in the memory 11_4 on the display device 12.

The graphics processing unit 11_2 may include multi-processors capable of simultaneously executing a plurality of threads and may be referred to as a parallel processing unit (PPU). The multi-processors may be programmed to execute various operations, and some multi-processors may function as a shading engine including one or more programmable shaders.

In some embodiments, the graphics processing unit 11_2 may perform deferred shading. Deferred shading may refer to a method of separating shading of fragments (or pixels) from calculation of complicated geometry and lighting conditions. In the first pass, data needed for shading may be collected and information about a color, diffusion, a depth, a normal, specularity, or the like may be rendered on a G-buffer (geometry buffer) G_BUF. Next, a shader may calculate lighting of each of fragments (or pixels) to perform shading. As illustrated in FIG. 1, the memory 11_4 may include the G-buffer G_BUF, and in the present specification, the G-buffer G_BUF may refer to data generated by performing the first pass of deferred shading. As the G-buffer G_BUF shares the same geometry as a final image (that is, a final image generated by deferred shading), the final image and the G-buffer G_BUF (or an image included in the G-buffer G_BUF) may correspond to each other on a one-to-one basis. An example of deferred shading will be described later with reference to FIG. 3.

In some embodiments, the graphics processing unit 11_2 may selectively shade fragments. For example, the graphics processing unit 11_2 may shade only some fragments and may calculate shading of the other fragments, i.e., unshaded fragments, via interpolation from shaded peripheral fragments, i.e., shaded fragments adjacent thereto. Accordingly, computing resources consumed in shading (e.g., fragment shading) may be reduced, and as a result, the cost of the graphics processing system 11 may be reduced and/or the time taken for completion of a graphics pipeline may be reduced. A method of performing selective shading and then performing interpolation as described above may be referred to as a multi-pass rendering method, and in the multi-pass rendering method, a quality of a final image may be determined based on an input of interpolation, i.e., based on which fragments are shaded.

In some embodiments, the graphics processing unit 11_2 may determine fragments that are selectively shaded based on the G-buffer G_BUF in a multi-pass rendering method. For example, the graphics processing unit 11_2 may detect an edge from an image of the G-buffer G_BUF, determine a fragment corresponding to the detected edge as a fragment to be shaded, and determine a fragment corresponding to an area from which no edge is detected as a fragment to be interpolated. As described above, as the G-buffer G_BUF generated by the first pass of deferred shading may include various pieces of information about a final image, the graphics processing unit 11_2 may reduce computing resources and also achieve a high-quality final image by implementing multi-pass rendering by using the G-buffer G_BUF.

The display device 12 may refer to an arbitrary device capable of outputting a visible image and may display final images provided by the graphics processing system 11. For example, the display device 12 may be implemented by using a liquid crystal display (LCD), a light-emitting diode (LED) display, an organic LED display, an active-matrix OLED (AMOLED) display, an electrochromic device (ECD), a digital mirror device (DMD), an actuated mirror device (AMD), a grating light valve (GLV), a plasma display panel (PDP), an electro-luminescent display (ELD), a vacuum fluorescent display (VFD), or the like, and may be in the form of a flat panel display, a curved display, a flexible display, or the like.

Figure 2:
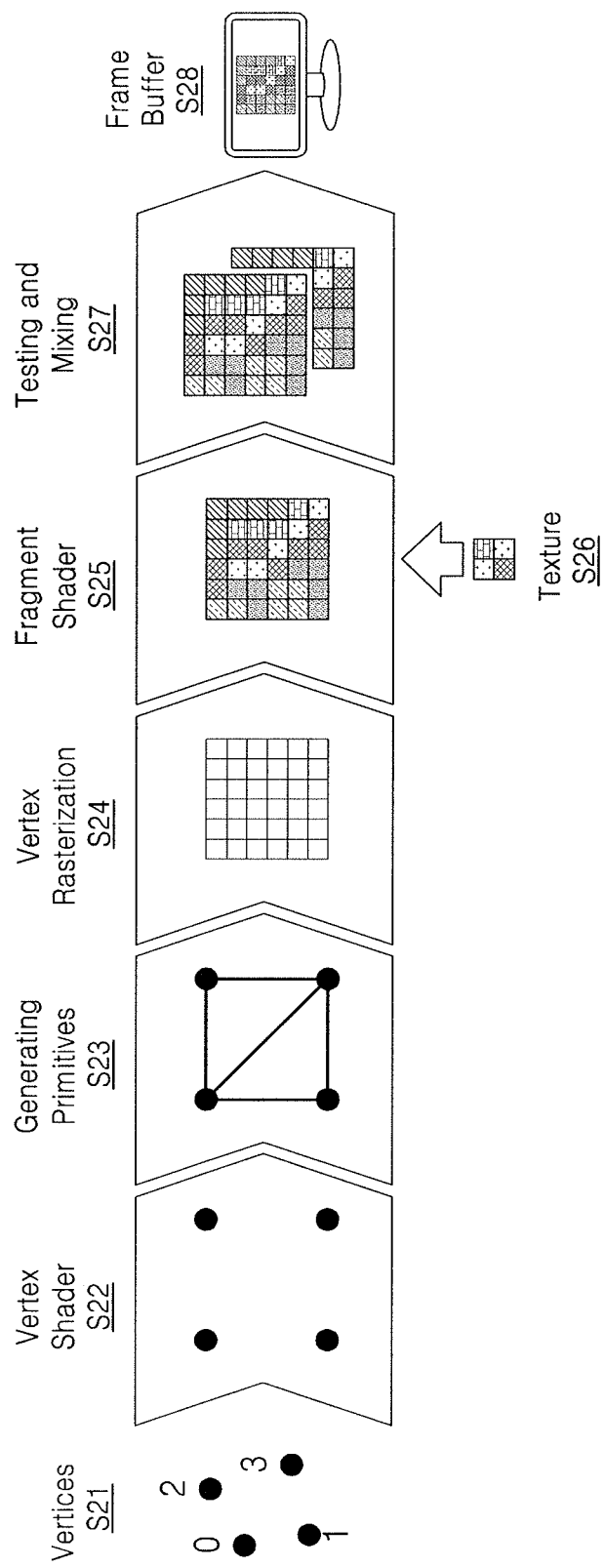
FIG. 2 illustrates an example of a graphics pipeline according to an embodiment.

FIG. 2 illustrates an example of a graphics pipeline according to an embodiment. In some embodiments, the graphics pipeline of FIG. 2 may be performed using the graphics processing system 11 of FIG. 1. For example, in the computing system 10 of FIG. 1, the application program 15_1 may provide data and commands to the graphics processing system 11 via the GPU driver 15_3, and in response to the data and commands, the graphics processing system 11 may perform graphics pipeline. Referring to FIG. 2, the graphics pipeline may be divided into geometry transformation of operation S21, operation S22, and operation S23, rasterization S24, and fragment shading S25.

In operation S21, vertices may be generated. For example, vertices 0, 1, 2, and 3 may be generated to indicate three-dimensional objects. In operation S22, vertex shading may be performed. For example, positions of vertices generated in operation S21 may be defined by vertex shading. In operation S23, a primitive may be generated. A primitive may refer to a point, a line, a polygon, or the like, formed using at least one vertex. For example, when the primitive is a triangle, the primitive is defined by three connected vertices.

In operation S24, rasterization of a primitive may be performed. Rasterization of a primitive may refer to dividing a primitive into at least one fragment, e.g., a base unit for performing graphics processing on a primitive. A primitive generated in operation S23 may include information about vertices, and as fragments are formed between vertices in operation S23, graphics processing may be subsequently performed.

In operation S25, fragment shading may be performed. In operation S25, a shaded fragment may be related to a pixel on a screen space, and fragment shading may be referred to as pixel shading. For example, a fragment may correspond to a base unit of graphics processing constituting a primitive, whereas a pixel may correspond to a base unit of graphics processing performed following fragment shading. In the present specification, a fragment and a pixel may be both used.

In operation S26, texturing may be performed. Texturing may refer to determining a color of fragments (or pixels) by using previously provided textures. Determining colors of all pixels by using previously provided textures may use less computing resources than determining the colors of all pixels by performing operation. In some embodiments, textures of different resolutions may be provided in advance, or colors of pixels may be determined as textures are mixed according to positions and sizes of objects. Reflecting textures in fragments may be referred to as texture fetch.

In operation S27, testing and mixing may be performed. For example, with respect to pixels corresponding to an identical position, a pixel to be finally displayed may be determined through a depth test. In addition, curling and clipping or the like may be performed, and a value of a pixel to be finally displayed, e.g., a color, may be determined. Next, in operation S28, a final image generated in previous operations may be stored in a frame buffer, and the final image stored in the frame buffer may be displayed.

As described above with reference to FIG. 1, the graphics processing unit 11_2 of FIG. 1 may generate a final image, based on a multi-pass rendering method, by shading some fragments and then performing interpolation. For example, in operation S25 of the graphics pipeline of FIG. 2, some fragments may be selected (this may also be referred to as sampling of fragments) and selected (or sampled) fragments may be shaded, whereas non-selected (or unshaded) fragments may be calculated from shaded fragments adjacent thereto. Here, by selecting fragments based on the G-buffer G_BUF, selected fragments may reflect a final image, thus preventing image distortion or aliasing due to inappropriate interpolation.

Figure 3:
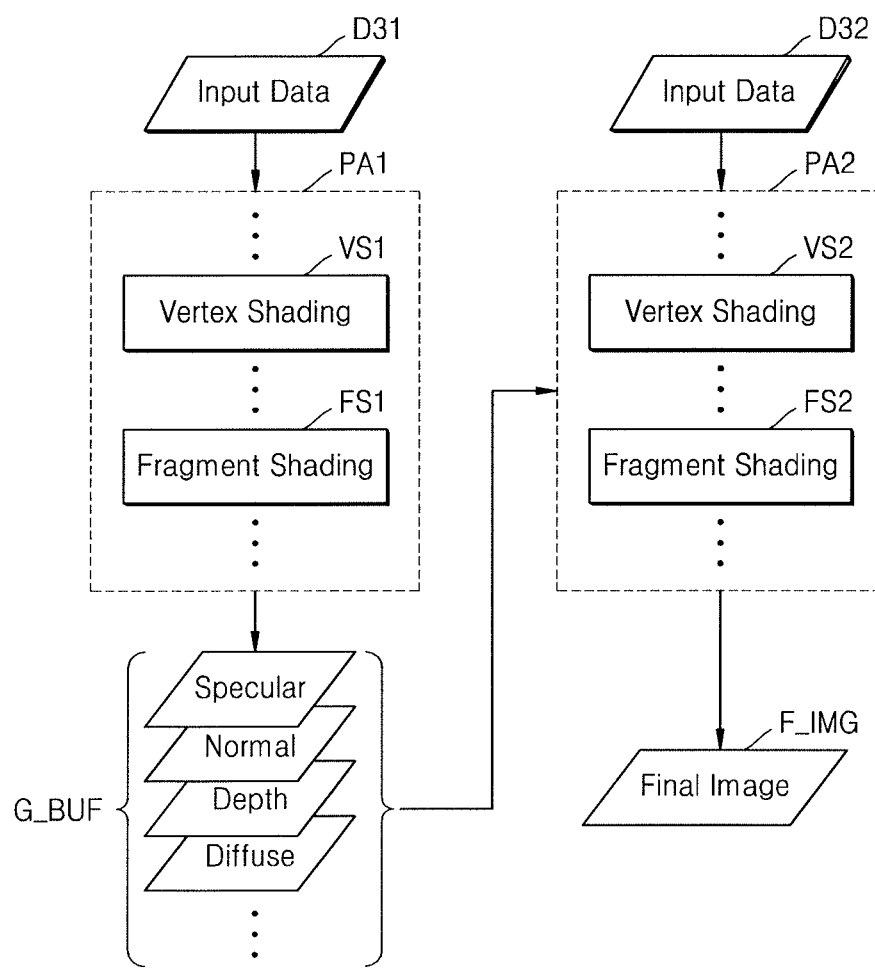
FIG. 3 illustrates deferred shading according to an embodiment.

FIG. 3 illustrates deferred shading according to an embodiment. As described above with reference to FIG. 1, deferred shading may include a first pass PA1 of generating a G-buffer G_BUF and a second pass PA2 of generating a final image F_IMG. In some embodiments, deferred shading of FIG. 3 may be performed using the graphics processing unit 11_2 of FIG. 1.

Referring to FIG. 3, in the first pass PA1, a G-buffer G_BUF may be generated from first input data D31 and, in the second pass PA2, a final image F_IMG may be generated from second input data D32 and the G-buffer G_BUF. The first pass PA1 may include vertex shading VS1 and fragment shading FS1, and the second pass PA2 may also include vertex shading VS2 and fragment shading FS2. In some embodiments, the vertex shading VS2 and the fragment shading FS2 of the second pass PA2 may be exclusively referred to as deferred shading.

In some embodiments, in the fragment shading FS1 of the first pass PA1, shading may be performed without considering lighting. Meanwhile, in the fragment shading FS2 of the second pass PA2, shading may be performed considering lighting. Accordingly, images included in the G-buffer G_BUF may include geometry information regardless of lighting and, in the second pass PA2, lighting may be calculated only with respect to fragments that are affected by lighting. Deferred shading may allow easy control of shader resources, simplified graphics pipeline, and facilitated rendering of complicated light sources. In some embodiments, second input data D32, which is simplified compared to the first input data D31 (i.e., second input data D32, from which some pieces of information are removed), may also be provided to the second pass PA2 together with the G-buffer G_BUF.

The G-buffer G_BUF may include images corresponding to various types of information, as a result of the first pass PA1. For example, as illustrated in FIG. 3, the G-buffer G_BUF may include a specular image, a normal line image, a depth image, a diffusion image, or the like. The G-buffer G_BUF illustrated in FIG. 3 is merely an example, and the G-buffer G_BUF may include only some of the images illustrated in FIG. 3 and/or may include other images not illustrated in FIG. 3.

Figure 4:
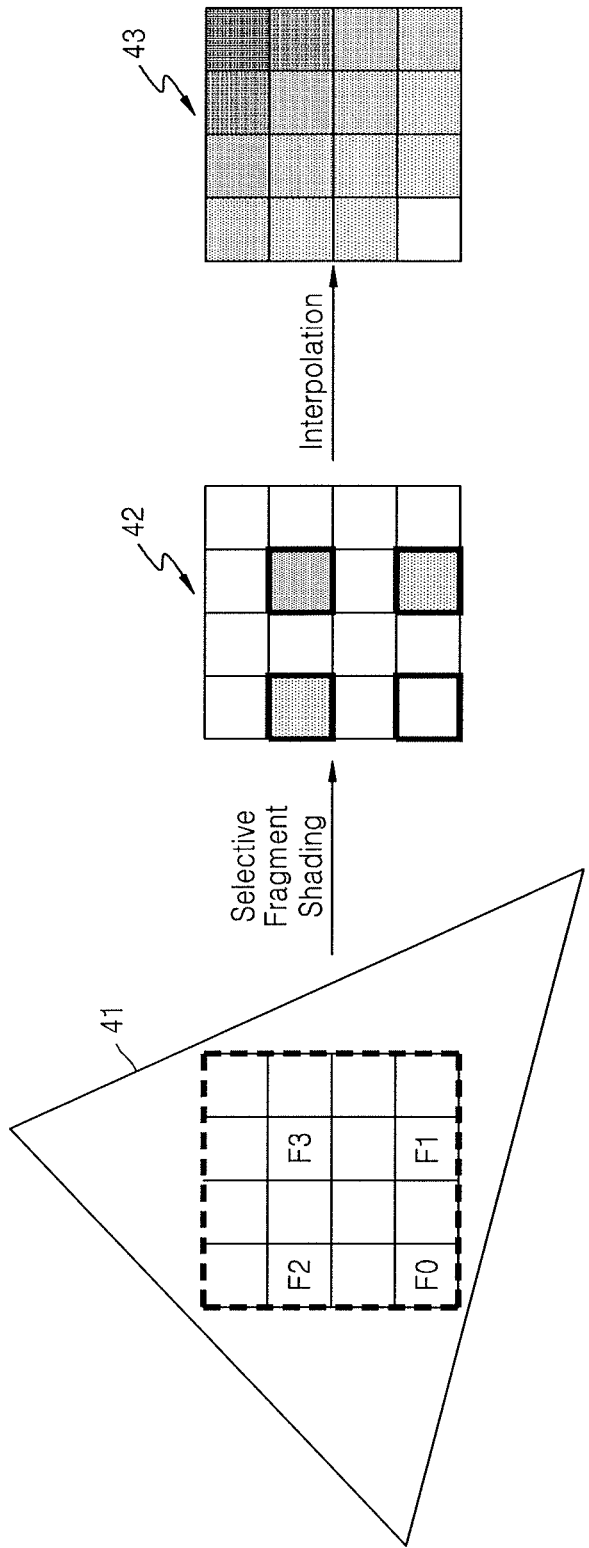
FIG. 4 illustrates an example of a multi-pass rendering method according to an embodiment.

FIG. 4 illustrates an example of a multi-pass rendering method according to an embodiment. In detail, FIG. 4 illustrates an example of shading 4×4 fragments in a primitive 41, e.g., a triangle.

From among the 4×4 fragments, four fragments F0, F1, F2, and F3 may be selected (or sampled). In some embodiments, a fragment may be selected according to at least one predefined pattern or according to depth information. For example, some of continuous fragments having a depth difference lower than a threshold may not be selected, while fragments having a depth difference relative to adjacent fragments greater than the threshold, e.g., an edge is detected, may be selected to be shaded. When shading is performed on fragments selected in a predefined pattern, e.g., like the four fragments of the 4×4 fragments 42, only those four selected fragments have values. Next, interpolation may be performed on the remaining fragments in the 4×4 fragments 42, based on values of the four fragments, such that all fragments of the 4×4 fragments 43 have values.

Figure 5:
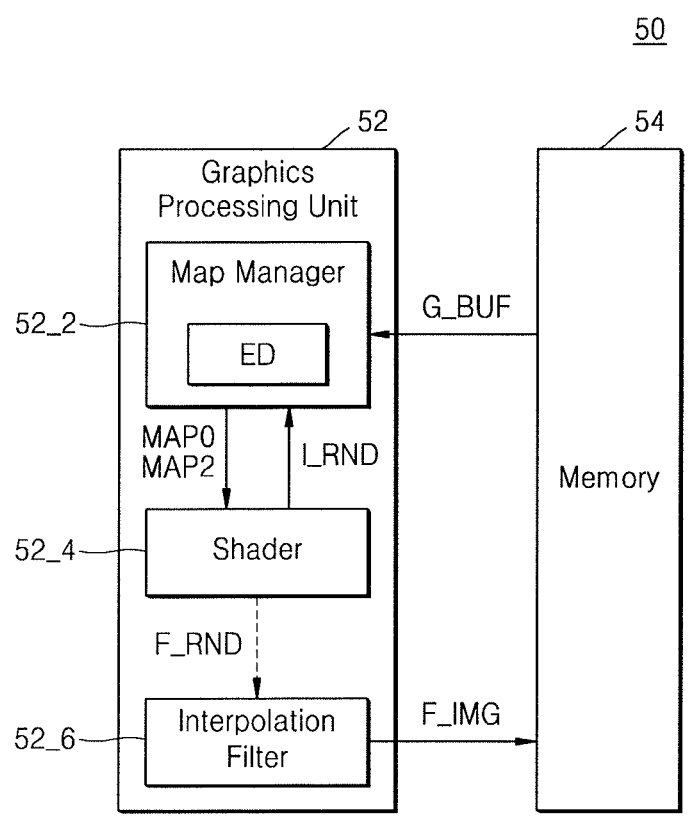
FIG. 5 illustrates a graphics processing system according to an embodiment.

FIG. 5 is a block diagram of a graphics processing system 50 according to an embodiment. As described above with reference to FIG. 1, a graphics processing unit 52 may perform interpolation on a fragment based on the G-buffer G_BUF stored in a memory 54 and store a final image F_IMG in the memory 54. As illustrated in FIG. 5, the graphics processing unit 52 may include a map manager 52_2, a shader 52_4, and an interpolation filter 52_6.

The map manager 52_2 may generate a fragment map and provide the fragment map to the shader 52_4. A fragment map may indicate a fragment to be shaded, i.e., a fragment on which fragment shading is to be performed by using a shader. For example, in the example of FIG. 4, a fragment map may indicate four fragments F0, F1, F2, and F3. In the present specification, a fragment which is to be shaded and is defined by a fragment map may be referred to as being included in a fragment map, whereas another fragment, i.e., a fragment to be interpolated, may be referred to as being not included in a fragment map. As illustrated in FIG. 5, the map manager 52_2 may include an edge detector ED and may generate or correct a fragment map by using the edge detector ED. The map manager 52_2 may receive a G-buffer G_BUF from the memory 54, provide an initial fragment map MAP0 and a second fragment map MAP2 to the shader 52_4, and receive intermediate rendering data I_RND from the shader 52_4. Operation of the map manager 52_2 will be described later with reference to FIG. 6.

The shader 52_4 may shade fragments according to a fragment map received from the map manager 52_2. For example, the shader 52_4 may perform selective shading by shading fragments indicated by a fragment map (for example, the fragments F0, F1, F2, and F3 of FIG. 4). In some embodiments, the shader 52_4 may receive an initial fragment map MAP0 from the map manager 52_2 and may generate intermediate rendering data I_RND by performing fragment shading (or rendering) according to the initial fragment map MAP0. Accordingly, the intermediate rendering data I_RND may include some fragments that are included in the initial fragment map MAP0 and shaded and other fragments that are not shaded.

The shader 52_4 may receive a second fragment map MAP2 from the map manager 52_2 and may generate final rendering data F_RND by performing fragment shading according to the second fragment map MAP2. As will be described later with reference to FIG. 6, the second fragment map MAP2 may correspond to a fragment map that is corrected from the initial fragment map MAP0 and may indicate fragments that are appropriate for a final image F_IMG based on the G-buffer G_BUF, as an object to be shaded. The shader 52_4 may provide final rendering data F_RND generated according to the second fragment map MAP2 to the interpolation filter 52_6.

The interpolation filter 52_6 may receive the final rendering data F_RND and may interpolate unshaded fragments based on the shaded fragments included in the final rendering data F_RND. The interpolation filter 52_6 may perform an arbitrary interpolation method in which adjacent shaded fragments are used, and interpolation may be performed such that, e.g., an unshaded fragment has an average of values of shaded peripheral fragments that are above and under and/or on the left and right of the unshaded fragment. In addition, in some embodiments, bilinear interpolation, bicubic interpolation, or the like may be performed. The interpolation filter 52_6 may generate a final image F_IMG in which all fragments such as the fragments 43 of FIG. 4 have values and store the final image F_IMG in the memory 54.

Figure 6:
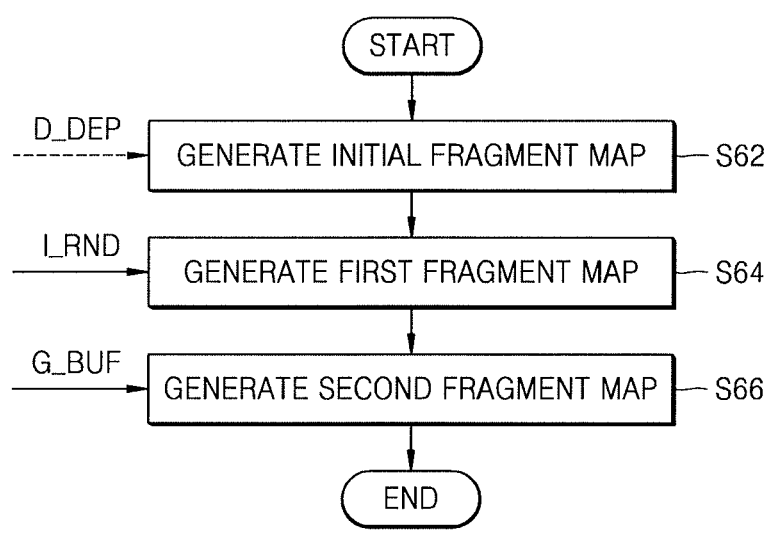
FIG. 6 illustrates a flowchart of an example of operation of a map manager of FIG. 5 according to an embodiment.

FIG. 6 is a flowchart of an example of operation of the map manager 52_2 of FIG. 5, according to an embodiment. As described above with reference to FIG. 5, the map manager 52_2 may generate a fragment map and provide the fragment map to the shader 52_4. Hereinafter, the embodiment of FIG. 6 will be described with reference to FIG. 5.

Referring to FIG. 6, in operation S62, the map manager 52_2 may generate an initial fragment map MAP0. In some embodiments, the map manager 52_2 may generate an initial fragment map MAP0 indicating some fragments, according to a predefined pattern. In addition, in some embodiments, the map manager 52_2 may obtain depth data D_DEP generated by a depth pass and generate an initial fragment map MAP0 based on the depth data D_DEP. For example, the map manager 52_2 may detect, from the depth data D_DEP, adjacent fragments which have a depth difference greater than a threshold, by using an edge detector ED, and add the detected fragments to the initial fragment map MAP0.

In operation S64, the map manager 52_2 may generate a first fragment map MAP1. In some embodiments, the map manager 52_2 may generate a first fragment map MAP1 by adding or removing a fragment to or from the initial fragment map MAP0 based on intermediate rendering data I_RND. For example, the map manager 52_2 may detect fragments in which a difference between adjacent, shaded fragments is greater than a threshold, in intermediate rendering data I_RND, by using an edge detector ED, and may add that fragment between the detected fragments to the first fragment map MAP1. In addition, the map manager 52_2 may remove a fragment, corresponding to an area from which no edge is detected, from the first fragment map MAP1.

In operation S66, the map manager 52_2 may generate a second fragment map MAP2. In some embodiments, the map manager 52_2 may generate a second fragment map MAP2 by adding or removing a fragment to or from the first fragment map MAP1 based on a G-buffer G_BUF. For example, the map manager 52_2 may detect an edge from an image included in the G-buffer G_BUF by using the edge detector ED and add a fragment corresponding to the detected edge, to the second fragment map MAP2. In addition, the map manager 52_2 may remove a fragment corresponding to an area from which no edge is detected, from the second fragment map MAP2. The example of operation S66 will be described later with reference to FIGS. 7A and 7B.

Figure 7A:
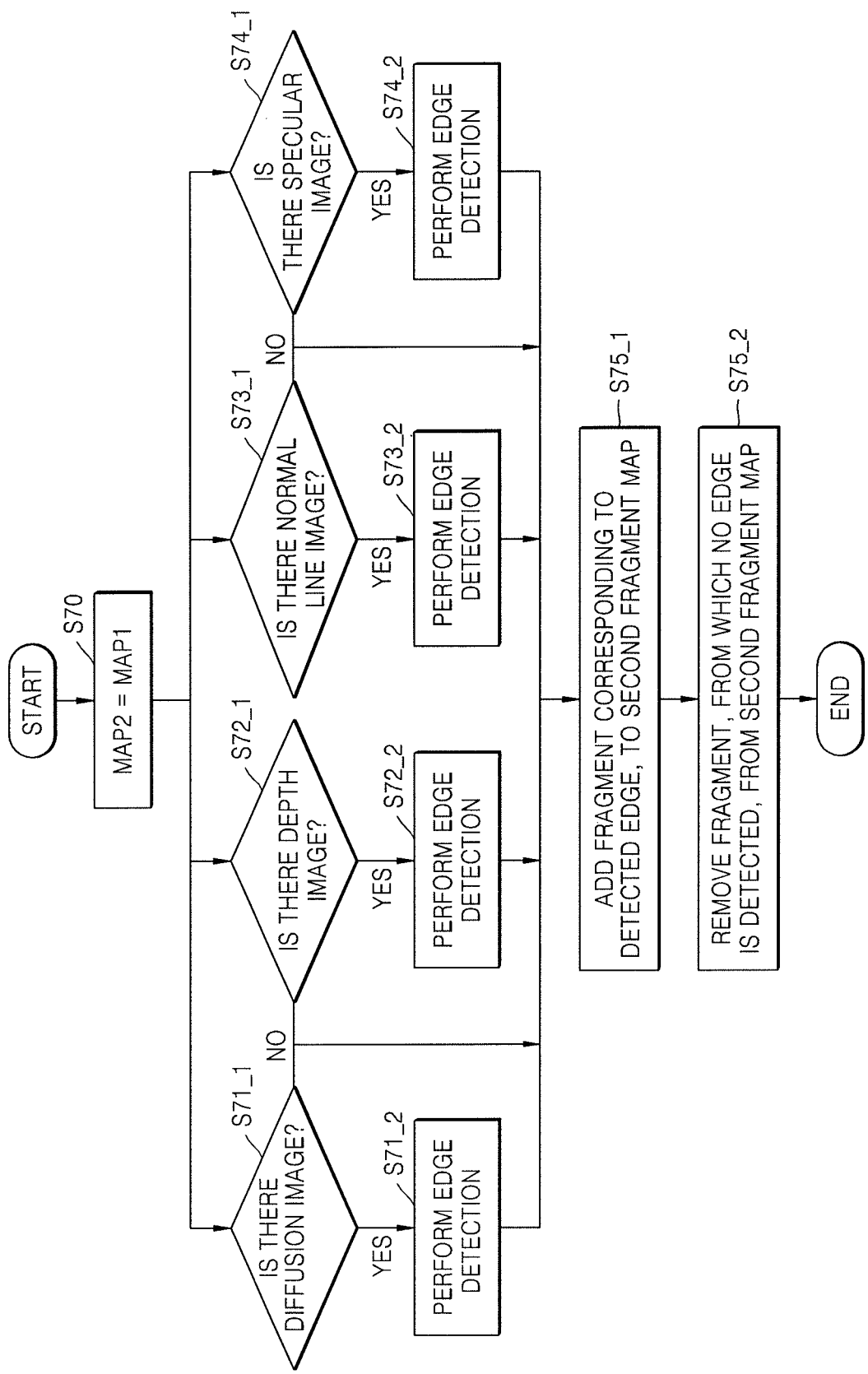

FIGS. 7A and 7B are flowcharts of a method of generating a second fragment map MAP2, according to an embodiment. As described above with reference to FIGS. 5 and 6, the second fragment map MAP2 may be used by the shader 52_4 to generate final rendering data F_RND. In some embodiments, the method of FIGS. 7A and 7B may be examples of operation S66 of FIG. 6 and may be performed by using the map manager 52_2 of FIG. 5. Hereinafter, the embodiments of FIGS. 7A and 7B will be described with reference to FIGS. 5 and 6.

Referring to FIG. 7A, in some embodiments, a second fragment map MAP2 including a fragment corresponding to an edge detected from at least one image from among images included in a G-buffer G_BUF may be generated. In addition, in some embodiments, a second fragment map MAP2 may be generated by removing a fragment corresponding to an area from which no edge is detected in all images included in the G-buffer G_BUF. For example, the map manager 52_2 may evaluate all fragments.

In operation S70, the second fragment map MAP2 is set as a first fragment map MAP1. Accordingly, the second fragment map MAP2 may include fragments included in an initial fragment map MAP0 and fragments added based on intermediate rendering data I_RND.

In operations S71_1, S72_1, S73_1, and S74_1, checking whether a diffusion image, a depth image, a normal line image, and a specular image are included in the G-buffer G_BUF may be performed, respectively. When the images described above are included in the G-buffer G_BUF, an edge may be detected from that image in each of operations S71_2, S72_2, S73_2, and S74_2, respectively, and operation S75_1 may be performed subsequently. When one or more of the images described above are not included in the G-buffer G_BUF, edge detection may be performed on the remaining images therein. While only four images are illustrated in the example of FIG. 7A, in some embodiments, edge detection may also be further performed on an additional image (e.g., a color image).

In operation S75_1, a fragment corresponding to the detected edge not in the first fragment map MAP1 may be added to the second fragment map MAP2. For example, when an edge is detected from at least one of images included in the G-buffer G_BUF, a fragment corresponding to the detected edge may be added to the second fragment map MAP2. Accordingly, the second fragment map MAP2 may include a fragment corresponding to the edge detected from an image included in the G-buffer G_BUF. Further, fragments corresponding to any different edges detected from the different images in the G-buffer G_BUF may be added to the second fragment map MAP2.

In operation S75_2, a fragment corresponding to an area from which no edge is detected that was in the first fragment map MAP1 may be removed from the second fragment map MAP2. For example, when an edge is detected in none of images included in the G-buffer G_BUF, a fragment corresponding to the undetected edge may be removed. The fragment removed from the second fragment map MAP2 may not be shaded by the shader 52_4 but instead may be calculated by using the interpolation filter 52_6. In some embodiments, operation S75_2 may be omitted, and accordingly, the second fragment map MAP2 may be identical to the first fragment map MAP1 or may include fragments included in the first fragment map MAP1 and additional fragments.

Referring to FIG. 7B, in some embodiments, the second fragment map MAP2 may be generated by evaluating the first fragment map MAP1. For example, the map manager 52_2 may evaluate fragments that are not included in the first fragment map MAP1, i.e., fragments to be interpolated, and may generate a second fragment map MAP2 by correcting the first fragment map MAP1 based on an evaluation result. In some embodiments, evaluation may be performed on a group of fragments including a plurality of fragments, and when an evaluation result is a failure, a fragment, from which an edge is detected, from among the group of fragments, may be added to the second fragment map MAP2. Thus, only fragments may be added to the second fragment map MAP2, not removed therefrom.

In operation S76_1, a diffusion image may be checked. For example, by using the edge detector ED, the map manager 52_2 may determine whether there is a diffusion image in the G-buffer G_BUF obtained from the memory 54. The edge detector ED may detect an edge by using an arbitrary method, e.g., a search-based method and/or a zero-crossing method. When there is not a diffusion image, operation S77_1 may be performed subsequently. When there is a diffusion image, edge detection of a diffusion image may be performed on fragments that are not included in the first fragment map MAP1. In operation S76_3, when an edge is detected from a diffusion image, an evaluation result in operation S80_2 may be determined to be a failure, and when no edge is detected from a diffusion image, operation S77_1 may be performed subsequently. When the evaluation result in a failure in operation S80_2, the fragment that resulted in the error may be added to the first fragment map MAP1 to generate the second fragment map MAP2.

When there is no diffusion image in the G-buffer G_BUF or no edge is detected in the diffusion image, a depth image may be checked in operation S77_1. For example, the map manager 52_2 may determine whether there is a depth image in the G-buffer G_BUF obtained from the memory 54. When there is not a depth image, operation S78_1 may be performed subsequently. When there is a depth image, edge detection of a depth image may be performed in operation S77_2 on fragments that are not included in the first fragment map MAP1. In operation S77_3, when an edge is detected from the depth image, an evaluation result in operation S80_2 may be determined to be a failure, and when no edge is detected from a depth image, operation S78_1 may be performed subsequently. When the evaluation result in a failure in operation S80_2, the fragment that resulted in the error may be added to the first fragment map MAP1 to generate the second fragment map MAP2.

When there is no depth image in the G-buffer G_BUF or no edge is detected in the depth image, a normal line image may be checked in operation S78_1. For example, the map manager 52_2 may determine whether there is a normal line image in the G-buffer G_BUF obtained from the memory 54. When there is not a normal line image, operation S79_1 may be performed subsequently. When there is a normal line image, edge detection of the normal line image may be performed in operation S78_2 on fragments that are not included in the first fragment map MAP1. In operation S78_3, when an edge is detected from a normal line image, an evaluation result in operation S80_2 may be determined to be a failure, and when no edge is detected from a normal line image, operation S79_1 may be performed subsequently. When the evaluation result in a failure in operation S80_2, the fragment that resulted in the error may be added to the first fragment map MAP1 to generate the second fragment map MAP2.

When there is no normal line image in the G-buffer G_BUF or no edge is detected in the normal line image, a specular image may be checked in operation S79_1. For example, the map manager 52_2 may determine whether there is a specular image in the G-buffer G_BUF obtained from the memory 54. When there is no specular image, i.e., when there are no images in the G-buffer G_BUF, an evaluation result in operation S80_2 may be determined to be a failure. When there is a specular image, edge detection of the specular image may be performed in operation S79_2 on fragments that are not included in the first fragment map MAP1. When an edge is detected in operation S79_3, an evaluation result in operation S80_2 may be determined to be a failure, and when no edge is detected from a specular image, an evaluation result in operation S80_1 may be determined to be a pass, i.e., the first fragment map MAP1 does not need to be altered. When the evaluation result in a failure in operation S80_2, the fragment that resulted in the error may be added to the first fragment map MAP1 to generate the second fragment map MAP2.

Figure 8:
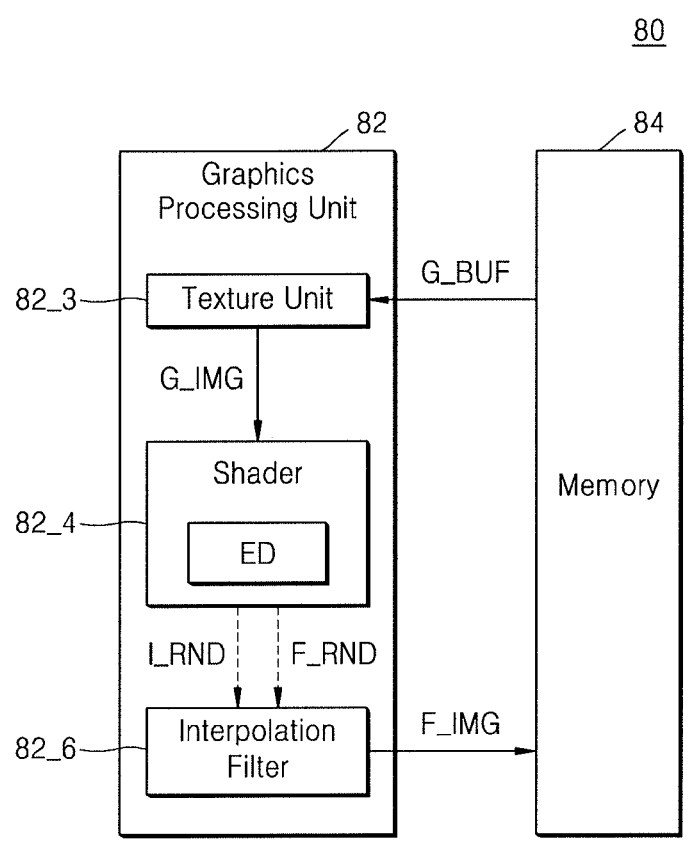
FIG. 8 illustrates a block diagram of a graphics processing system according to an embodiment.

FIG. 8 illustrates a graphics processing system 80 according to an embodiment. As described above with reference to FIG. 1, a graphics processing unit 82 may perform interpolation on fragments based on a G-buffer G_BUF stored in a memory 84 and store a final image F_IMG in the memory 84. As illustrated in FIG. 8, the graphics processing unit 82 may include a texture unit 82_3, a shader 82_4, and an interpolation filter 82_6.

The texture unit 82_3 may receive the G-buffer G_BUF and generate a G-buffer image G_IMG and provide the G-buffer image G_IMG to the shader 82_4. The texture unit 82_3 may refer to hardware module, software module, or a combination thereof each to execute texturing (for example, operation S26 of FIG. 2). The texture unit 82_3 may be referred to as a texture mapping unit (TMU) and may perform texture fetch. In some embodiments, the shader 82_4 may obtain images included in the G-buffer G_BUF via the texture unit 82_3, i.e., a G-buffer image G_IMG.

The shader 82_4 may receive a G-buffer image G_IMG and generate intermediate rendering data I_RND and final rendering data F_RND. Each of the intermediate rendering data I_RND and the final rendering data F_RND may include some shaded fragments and the rest, i.e., unshaded fragments, similarly to the unselected 4×4 fragments 42 of FIG. 4. The shader 82_4 may include an edge detector ED and generate final rendering data F_RND by detecting an edge from the G-buffer image G_IMG. In the example of FIG. 5, the G-buffer G_BUF may be reflected in a fragment map by using the map manager 52_2, and in the example of FIG. 8, the G-buffer G_BUF may be reflected in the final rendering data F_RND by using the texture unit 82_3 and the shader 82_4. Operation of the shader 82_4 will be described later with reference to FIG. 9.

The interpolation filter 82_6 may receive intermediate rendering data I_RND and final rendering data F_RND from the shader 82_4 and generate a final image F_IMG in which all fragments have values, from the intermediate rendering data I_RND and the final rendering data F_RND. Compared with the interpolation filter 52_6 of FIG. 5, the interpolation filter 82_6 may further receive intermediate rendering data I_RND. The interpolation filter 82_6 may store the final image F_IMG in the memory 84. Operation of the interpolation filter 82_6 will be described later with reference to FIGS. 10 and 11.

Figure 9:
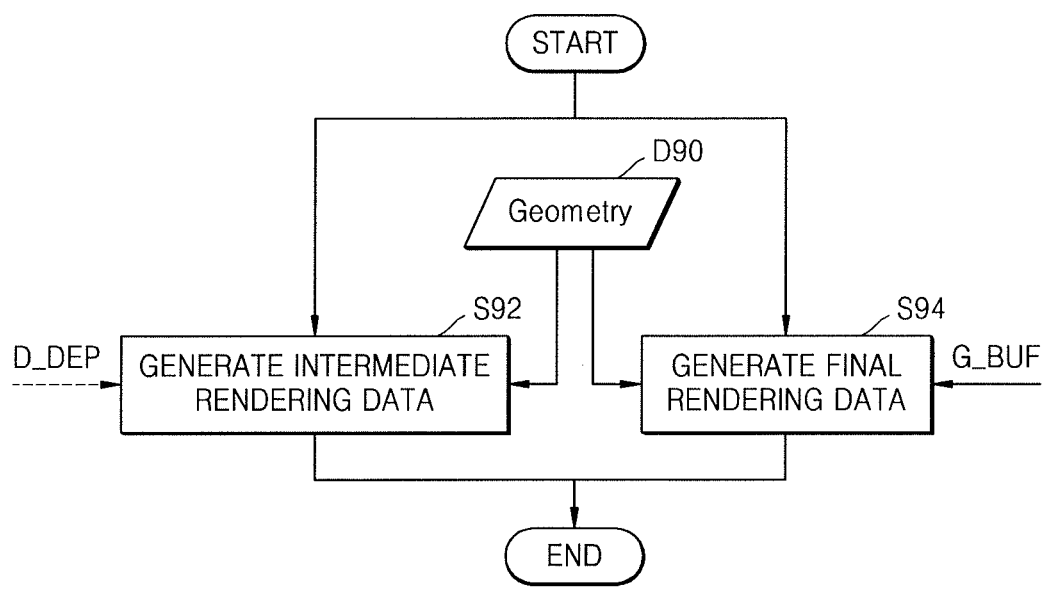
FIG. 9 illustrates a flowchart of an example of operation of a shader of FIG. 8, according to an embodiment.

FIG. 9 is a flowchart of an example of operation of the shader 82_4 of FIG. 8 according to an embodiment. As described above with reference to FIG. 8, the shader 82_4 may generate intermediate rendering data I_RND and final rendering data F_RND and provide the same to the interpolation filter 82_6. Operation S92 and operation S94 of FIG. 9 may be performed in parallel with each other as illustrated in FIG. 9 or may be performed sequentially in some embodiments. The embodiment of FIG. 9 will be described with reference to FIG. 8.

In operation S92, the shader 82_4 may generate intermediate rendering data I_RND from geometry data D90. For example, the geometry data D90 may include information about vertices, primitives, or the like, and the shader 82_4 may generate intermediate rendering data I_RND by performing fragment shading (or rendering) based on an initial fragment map MAP0. In some embodiments, the shader 82_4 may generate an initial fragment map MAP0 or may receive an initial fragment map MAP0 from the outside. For example, the shader 82_4 may generate an initial fragment map MAP0 indicating some fragments, according to a predefined pattern, or may obtain depth data D_DEP generated by a depth pass, e.g., edge detection, to generate an initial fragment map MAP0 based on the depth data D_DEP. When an initial fragment map MAP0 is generated based on a predefined regular pattern, the intermediate rendering data I_RND may correspond to an image having a low resolution.

In operation S94, the shader 82_4 may generate final rendering data F_RND from the geometry data D90 based on the G-buffer G_BUF. For example, the shader 82_4 may obtain images included in the G-buffer G_BUF via the texture unit 82_3, i.e., the G-buffer image G_IMG, and detect an edge from the G-buffer image G_IMG. The shader 82_4 may shade a fragment (or pixel) corresponding to the detected edge and may discard a fragment (or pixel) of an area from which no edge is detected. Accordingly, an image included in the final rendering data F_RND may include a fragment (or pixel) having an invalid value and have a high (or full) resolution on the other hand. In some embodiments, the shader 82_4 may generate a discard flag (for example, D_FLG of FIG. 10) indicating discarded fragments (or pixels), and provide the discard flag to the interpolation filter 82_6 with the final rendering data F_RND. The interpolation filter 82_6 may identify an invalid fragment (or pixel) from the final rendering data F_RND based on the discard flag.

Figure 10:
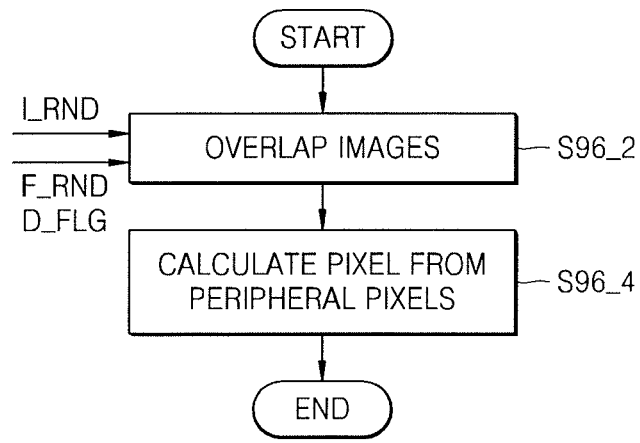
FIG. 10 illustrates a flowchart of an example of operation of an interpolation filter of FIG. 8, according to an embodiment.
Figure 11:
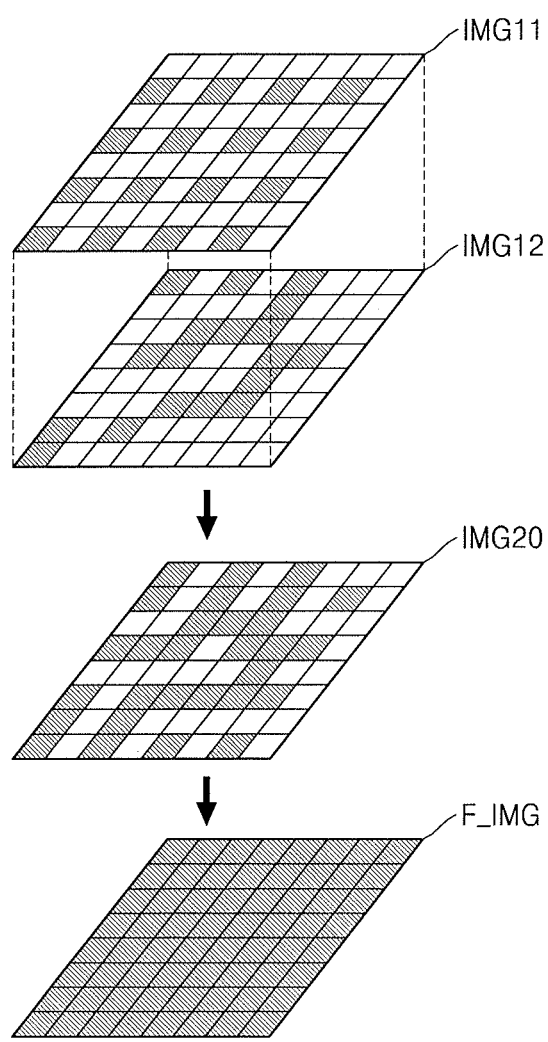
FIG. 11 illustrates examples of an image generated according to a method of FIG. 10, according to an embodiment.

FIG. 10 is a flowchart of an example of operation of the interpolation filter 82_6 of FIG. 8 according to an embodiment, and FIG. 11 illustrates examples of an image generated according to the method of FIG. 10, according to an embodiment. As described above with reference to FIG. 8, the interpolation filter 82_6 may receive intermediate rendering data I_RND and final rendering data F_RND from the shader 82_4, or may receive a discard flag D_FLG.

Hereinafter, the embodiments of FIGS. 10 and 11 will be described with reference to FIG. 8.

Referring to FIG. 10, images may be overlapped in operation S96_2. For example, as illustrated in FIG. 11, the interpolation filter 82_6 may include a first image IMG11 included in intermediate rendering data I_RND and a second image IMG12 included in final rendering data F_RND. The interpolation filter 82_6 may identify an invalid pixel from the second image IMG12 based on the discard flag D_FLG. As indicated by the highlighted pixels of FIG. 11, the first image IMG11 and the second image IMG12 may each include some shaded pixels. The interpolation filter 82_6 may overlap the first image IMG11 and the second image IMG12 to generate an overlap image IMG20. Accordingly, as illustrated in FIG. 11, the overlap image IMG20 may include all shaded pixels (or pixels having values) in the first image IMG11 and the second image IMG12. In some embodiments, as illustrated in FIG. 11, when intermediate rendering data I_RND is generated based on the predefined regular pattern, the first image IMG11 may correspond to an image of a relatively low resolution compared to the final image F_IMG.

In operation S96_4, a pixel may be calculated from peripheral pixels. For example, the interpolation filter 82_6 may generate values for each of invalid pixels, i.e., pixels having no value, in the overlap image IMG20, from pixels having a valid value adjacent thereto. The interpolation filter 82_6 may generate pixels by using an arbitrary interpolation method, and accordingly, a final image F_IMG in which all pixels have valid values may be generated.

Figure 12:
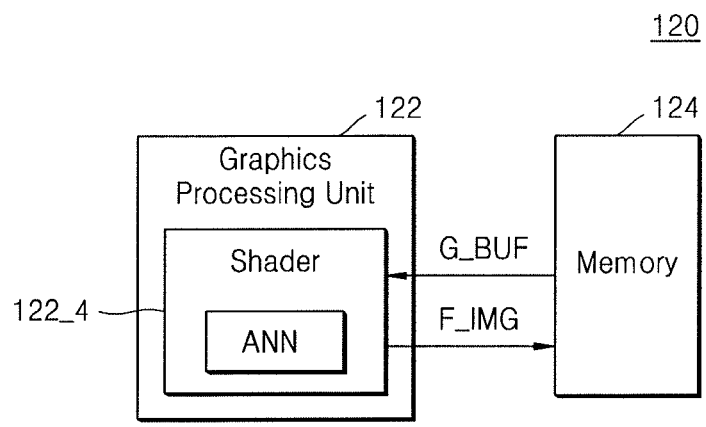
FIG. 12 illustrates a graphics processing system according to an embodiment.

FIG. 12 is a block diagram of a graphics processing system 120 according to an embodiment. As described above with reference to FIG. 1, a graphics processing unit 122 may perform interpolation on fragments based on a G-buffer G_BUF stored in a memory 124 and store a final image F_IMG in the memory 124. As illustrated in FIG. 12, the graphics processing unit 122 may include a shader 122_4.

The shader 122_4 may include an artificial neural network (ANN) and generate a final image F_IMG based on the G-buffer G_BUF received from the memory 124. An ANN may refer to a structure that implements sets in which artificial neurons (or neuron models) are interconnected. An artificial neuron may generate output data by performing simple operations on input data, and the output data may be transferred to another artificial neuron.

The shader 122_4 may include an ANN that is trained to output a final image F_IMG from an image of the G-buffer G_BUF and an image of intermediate rendering data I_RND. Accordingly, the shader 122_4 may generate intermediate rendering data I_RND, and obtain a final image F_IMG from the ANN by providing the intermediate rendering data I_RND and the G-buffer G_BUF to the ANN. Operation of the shader 122_4 will be described with reference to FIG. 13.

Figure 13:
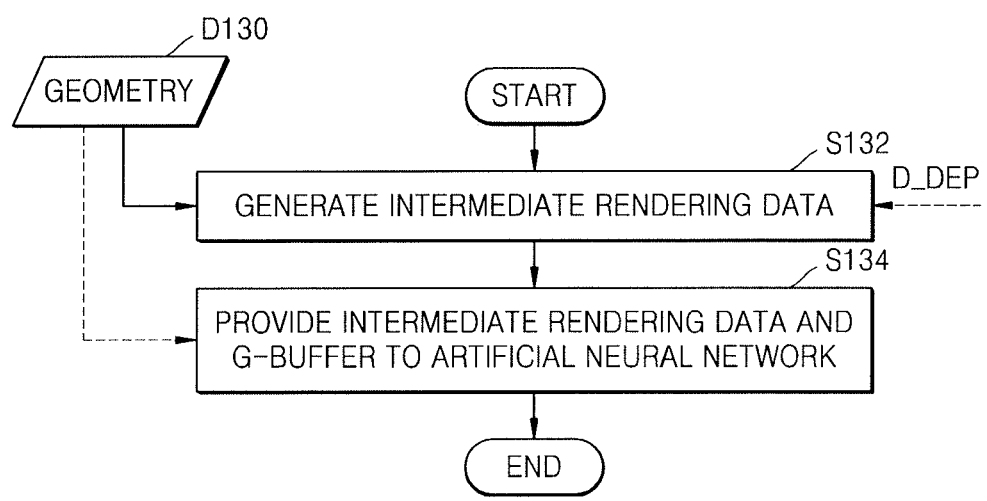
FIG. 13 illustrates a flowchart of an example of operation of a shader of FIG. 12, according to an embodiment.

FIG. 13 is a flowchart of an example of operation of the shader 122_4 of FIG. 12 according to an embodiment. Hereinafter, the embodiment of FIG. 13 will be described with reference to FIG. 12.

In operation S132, the shader 122_4 may generate intermediate rendering data I_RND from geometry data D130. For example, the geometry data D130 may include information about vertices, primitives, or the like, and the shader 122_4 may generate intermediate rendering data I_RND by performing fragment shading (or rendering) based on an initial fragment map MAP0. In some embodiments, the shader 122_4 may generate an initial fragment map MAP0 or may receive an initial fragment map MAP0 from the outside. For example, the shader 122_4 may generate an initial fragment map MAP0 indicating some fragments, according to a predefined pattern, or may obtain depth data D_DEP generated by a depth pass, e.g., edge detection, and generate an initial fragment map MAP0 based on the depth data D_DEP.

In operation S134, the shader 122_4 may provide the intermediate rendering data I_RND and the G-buffer G_BUF to the ANN. As described above with reference to FIG. 12, the ANN is trained to output a final image F_IMG from an image of the intermediate rendering data I_RND and an image of the G-buffer G_BUF. Thus, the ANN may output a final image F_IMG corresponding to the image of the intermediate rendering data I_RND and the image of the G-buffer G_BUF. In some embodiments, the ANN may further receive the geometry data D130, and the shader 122_4 may further provide the geometry data D130 to the ANN.

Figure 14:
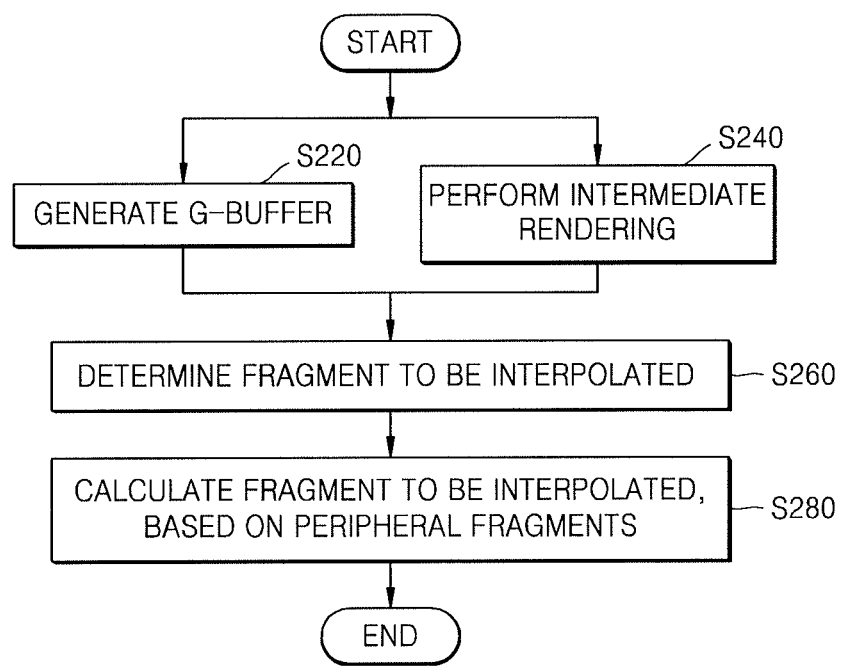
FIG. 14 illustrates a flowchart of a graphics processing method according to an embodiment.

FIG. 14 is a flowchart of a graphics processing method according to an embodiment. For example, the method of FIG. 14 may be performed by using the graphics processing system 50 of FIG. 5 or the graphics processing system 80 of FIG. 8. Hereinafter, the embodiment of FIG. 14 will be described with reference to FIG. 5.

In operation S220, a G-buffer G_BUF may be generated. As described above with reference to FIG. 3, the G-buffer G_BUF may be generated as a result of the first pass PA1 in deferred shading. The graphics processing unit 52 may generate a G-buffer G_BUF by processing input data (for example, the input data D31 of FIG. 3) according to the first pass PA1, and the G-buffer G_BUF may include at least one image corresponding to a screen space.

In operation S240, intermediate rendering may be performed. Intermediate rendering may refer to generating intermediate rendering data I_RND. For example, the graphics processing system 50 may perform rendering based on the initial fragment map MAP0 to generate intermediate rendering data I_RND having some fragments that have valid values. Operation S220 and operation S240 may be performed in parallel with each other as illustrated in FIG. 14 or may be performed sequentially.

In operation S260, a fragment to be interpolated may be determined. A fragment to be interpolated may refer to a fragment that is not shaded by a shader. Both the intermediate rendering data I_RND and an image of the G-buffer G_BUF corresponding to a screen space may be used to accurately determine fragments to be interpolated. Fragments other than fragments to be interpolated, i.e., fragments to be shaded, may be shaded by using the shader 52_4 as described above. Examples of operation S260 will be described later with reference to FIGS. 15 and 17.

In operation S280, a fragment to be interpolated, based on shaded peripheral fragments, may be calculated. In some embodiments, a fragment to be interpolated may be identified based on a fragment map. In some embodiments, a fragment to be interpolated may also be identified by overlapping images including some shaded fragments. Examples of operation S280 will be described later with reference to FIGS. 15 and 17.

Figure 15:
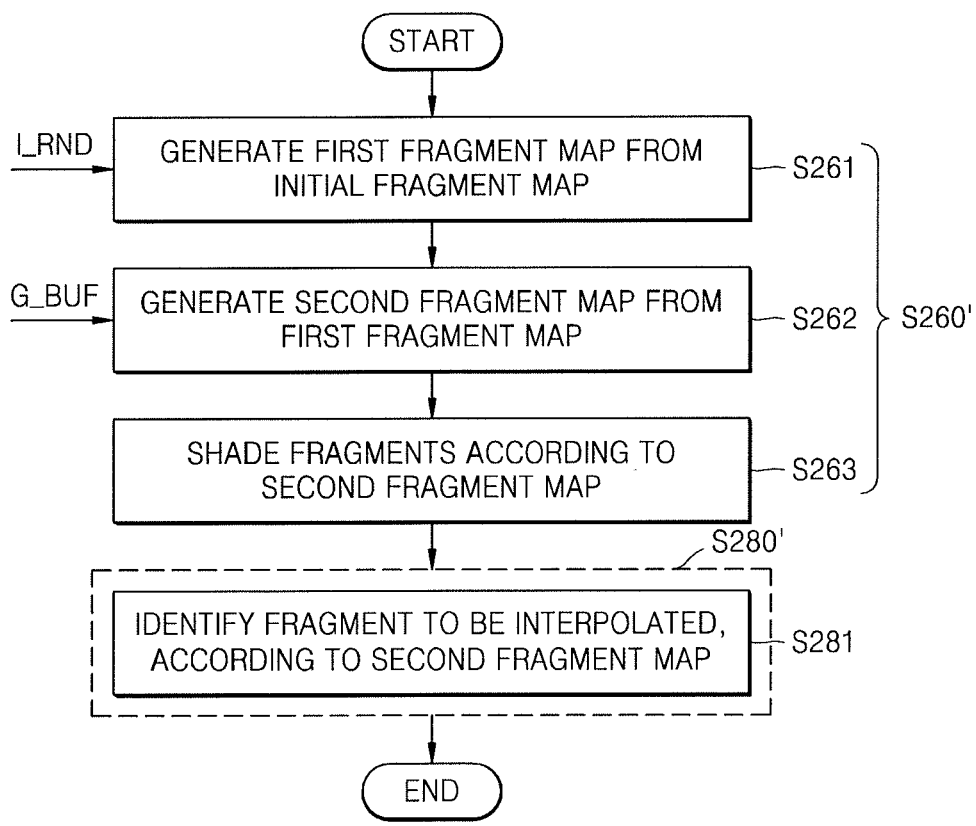
FIG. 15 illustrates a flowchart of examples of operation S260 and operation S280 of FIG. 14 according to an embodiment.

FIG. 15 is a flowchart of examples of operation S260 and operation S280 of FIG. 14, according to an embodiment. As described above with reference to FIG. 14, in operation S260' of FIG. 15, a fragment to be interpolated may be determined and, in operation S280', a fragment to be interpolated, i.e., unshaded fragments, may be calculated based on shaded peripheral fragments, e.g., shaded fragments adjacent thereto. As illustrated in FIG. 15, operation S260' may include a plurality of operations, e.g., operations S261, S262, and S263, and operation S280' may include operation S281. In some embodiments, the method of FIG. 15 may be performed using the graphics processing system 50 of FIG. 5, and the embodiment of FIG. 15 will now be described with reference to FIGS. 5 and 14.

In operation S261, a first fragment map MAP1 is generated from an initial fragment map MAP0. For example, the map manager 52_2 may generate an initial fragment map MAP0 based on a preset pattern and/or depth data, e.g., edge detection. In addition, the map manager 52_2 may receive intermediate rendering data I_RND generated by rendering performed using the shader 52_4 according to the initial fragment map MAP0 and may generate a first fragment map MAP1 from the initial fragment map MAP0 based on the intermediate rendering data I_RND. In some embodiments, the first fragment map MAP1 may be generated by adding a fragment corresponding to an edge detected from the intermediate rendering data I_RND.

In operation S262, a second fragment map MAP2 may be generated from the first fragment map MAP1. For example, the map manager 52_2 may detect an edge from an image included in the G-buffer G_BUF in a fragment that was not in the first fragment map MAP1 and may generate a second fragment map MAP2 by adding a fragment corresponding to the detected edge. An example of operation S262 will be described later with reference to FIG. 16.

In operation S263, fragments may be shaded according to the second fragment map MAP2. For example, the shader 52_4 may receive the second fragment map MAP2 from the map manager 52_2 and shade fragments included in the second fragment map MAP2. Accordingly, final rendering data F_RND that may include shaded fragments and unshaded fragments may be generated.

In operation S281, a fragment to be interpolated may be identified according to the second fragment map MAP2. For example, the interpolation filter 52_6 may receive the second fragment map MAP2 from the shader 52_4 or the map manager 52_2, and identify a fragment to be interpolated, based on the second fragment map MAP2. Next, the identified fragment to be interpolated may be calculated from shaded peripheral fragments.

Figure 16:
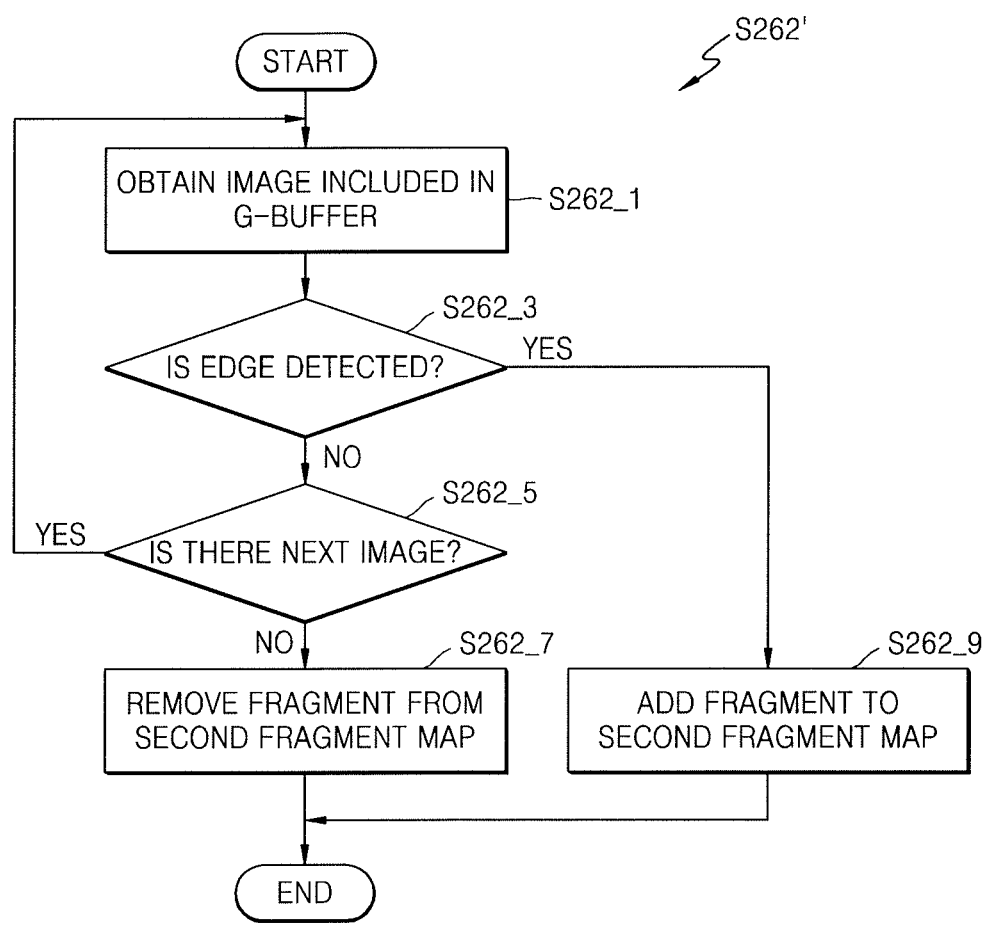
FIG. 16 illustrates a flowchart of an example of operation S262 of FIG. 15 according to an embodiment.

FIG. 16 is a flowchart of an example of operation S262 of FIG. 15, according to an embodiment. In detail, operation S262' of FIG. 16 indicates an operation that may performed on all fragments or may be performed only on fragments not included in the first fragment map MAP1. As described above with reference to FIG. 15, in operation S262' of FIG. 16, a second fragment map MAP2 may be generated from the first fragment map MAP1. Hereinafter, the embodiment of FIG. 16 will be described with reference to FIG. 5.

In operation S262_1, an image included in the G-buffer G_BUF may be obtained. The G-buffer G_BUF may include at least one image, and one of images included in the G-buffer G_BUF may be obtained. In operation S262_3, edge detection may be performed on an image obtained in operation S262_1. When an edge is detected, operation S262_9 may be subsequently performed. When no edge is detected operation S262_5 may be subsequently performed.

When an edge is detected, in operation S262_9, a fragment may be added to the second fragment map MAP2. For example, a fragment corresponding to a detected edge may likely have a value different from those of fragments adjacent thereto. Accordingly, this fragment may be added to the second fragment map MAP2.

On the other hand, when no edge is detected, whether there is a next image in the G-buffer G_BUF may be determined in operation S262_5. When there is a next image, in operation S262_1, the next image included in the G-buffer G_BUF may be obtained. On the other hand, when there is no next image, operation S262_7 may be subsequently performed.

In operation S262_7, when operation S262' s performed on all fragments, a fragment may be removed from the second fragment map MAP2. That is, a fragment that was in the first fragment map MAP1 corresponding to an area from which no edge is detected in all images included in the G-buffer G_BUF may be removed from the second fragment map MAP2. Thus, that fragment may be classified as a fragment to be interpolated.

Figure 17:
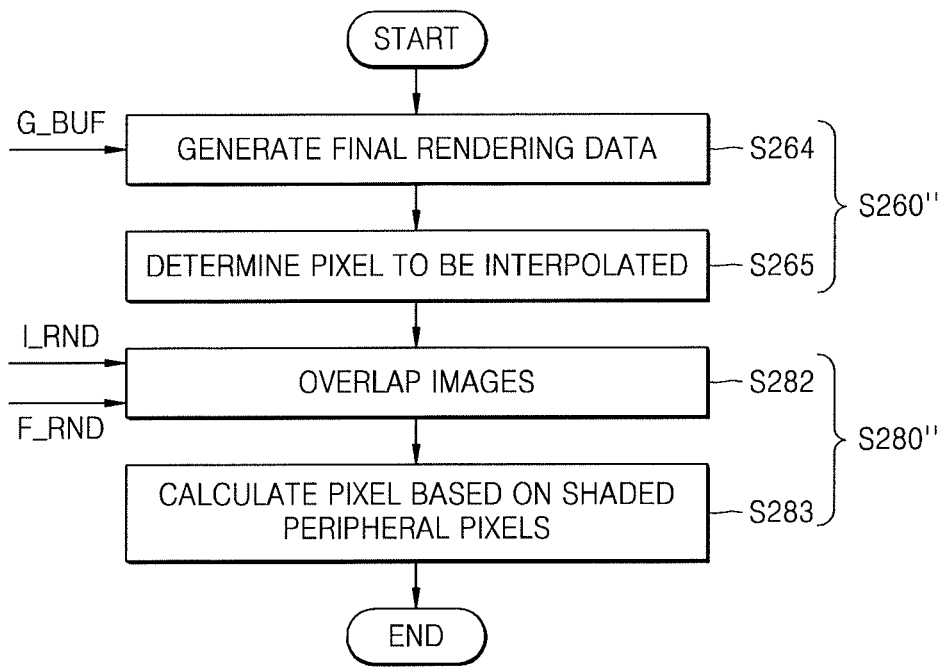
FIG. 17 illustrates a flowchart of examples of operation S260 and operation S280 of FIG. 14 according to an embodiment.

FIG. 17 is a flowchart of examples of operation S260 and operation S280 of FIG. 14, according to an embodiment. As described above with reference to FIG. 14, in operation S260" of FIG. 17, a fragment to be interpolated, may be determined, and in operation S280", interpolation of a fragment may be calculated based on shaded peripheral fragments. As illustrated in FIG. 17, operation S260" may include operation S264 and operation S265, and operation S280" may include operation S282 and operation S283. In some embodiments, the method of FIG. 17 may be performed using the graphics processing system 80 of FIG. 8 and the embodiment of FIG. 17 will now be described with reference to FIGS. 8 and 14.

In operation S264, final rendering data F_RND may be generated. For example, the shader 82_4 may obtain images included in the G-buffer G_BUF via the texture unit 82_3, that is, a G-buffer image G_IMG, and detect an edge from the G-buffer image G_IMG. The shader 82_4 may shade a pixel corresponding to the detected edge and discard a pixel of an area from which no edge is detected. Accordingly, an image included in the final rendering data F_RND may include an invalid pixel. Next, in operation S265, a fragment to be interpolated may be determined. For example, the shader 82_4 may determine a pixel corresponding to an area from which no edge is detected in all images included in the G-buffer G_BUF, as a pixel to be interpolated. In some embodiments, the shader 82_4 may generate a discard flag D_FLG indicating a pixel to be interpolated.

In operation S282, images may be overlapped. For example, the interpolation filter 82_6 may overlap an image of interpolation filter 82_6 and an image of final rendering data F_RND, and accordingly, as described above with reference to FIG. 11, an overlap image may be generated. Next, a pixel may be calculated based on shaded peripheral pixels in operation S283. For example, the interpolation filter 82_6 may calculate an invalid pixel from peripheral pixels having valid values by using arbitrary interpolation method, and as a result, a final image F_IMG may be generated.

Figure 18:
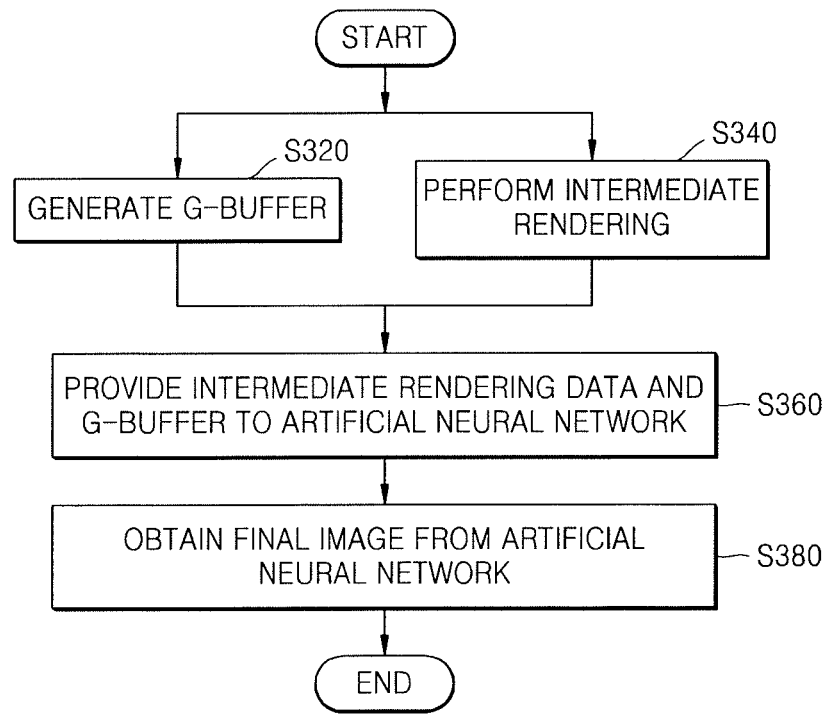
FIG. 18 illustrates a flowchart of a graphics processing method according to an embodiment.

FIG. 18 is a flowchart of a graphics processing method according to an embodiment. For example, the method of FIG. 18 may be performed by using the graphics processing system 120 of FIG. 12. Compared with the example of FIG. 14, an ANN may be used in the method of FIG. 18. Hereinafter, the embodiment of FIG. 18 will be described with reference to FIG. 12, and description of details provided with reference to FIG. 14 will be omitted in the description with reference to FIG. 18.

In operation S320, similarly to operation S220 of FIG. 14, a G-buffer G_BUF may be generated. In addition, in operation S340, similarly to operation S240 of FIG. 14, intermediate rendering may be performed. Accordingly, a G-buffer G_BUF and intermediate rendering data I_RND may be generated.

In operation S360, the intermediate rendering data I_RND and the G-buffer G_BUF may be provided to the ANN. As described above with reference to FIG. 12, the ANN may be included in the shader 122_4, and may be trained to output a final image F_IMG from an image of the G-buffer G_BUF and an image of the intermediate rendering data I_RND. In some embodiments, the ANN may be trained to output a final image F_IMG not only from an image of the G-buffer G_BUF and an image of the intermediate rendering data I_RND but also from geometry data (for example, the geometry data D130 of FIG. 13) used in intermediate rendering, and accordingly, the shader 122_4 may further provide geometry data to the ANN. Next, a final image F_IMG may be obtained from the ANN in operation S380.

One or more embodiments provide a graphics processor, a graphics processing system, and a graphics processing method, in which a fragment to be shaded is accurately detected to improve final image quality via interpolation.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A graphics processing system, comprising:
a graphics processor, the graphics processor generating a geometry-buffer (G-buffer) by performing a first pass of deferred shading; and
a memory to store the G-buffer,
wherein the graphics processor includes:
a map manager to generate a first fragment map and a second fragment map based on the G-buffer from the first pass of deferred shading, the first fragment map indicating fragments to be shaded among a plurality of fragments, and the second fragment map indicating fragments to be shaded among the plurality of fragments and being generated by adding at least one fragment to be shaded to the first fragment map or removing at least one fragment to be interpolated from the first fragment map, and
a shader to shade fragments according to the second fragment map,
wherein the map manager is to:
generate an initial fragment map; and
generate the first fragment map by adding or removing fragments to or from the initial fragment map based on intermediate rendering data obtained by rendering based on the initial fragment map.

2. The graphics processing system as claimed in claim 1, wherein the map manager is to generate the initial fragment map according to edges detected from a depth image and/or a predefined pattern.

3. The graphics processing system as claimed in claim 1, wherein the map manager is to generate the first fragment map according to edges detected from shaded fragments included in the intermediate rendering data.

4. The graphics processing system as claimed in claim 1, wherein the second fragment map includes at least one fragment that is not present in the first fragment map, and that corresponds to an edge detected from an image included in the G-buffer.

5. The graphics processing system as claimed in claim 1, wherein the second fragment map does not include at least one fragment that is present in the first fragment map, and that corresponds to an area in which no edge is detected in all images included in the G-buffer.

6. The graphics processing system as claimed in claim 1, wherein:
the memory is to store final rendering data that includes fragments shaded using the shader, and
the graphics processing system further comprises an interpolation filter to obtain the final rendering data to generate a final image, including shaded fragments, by interpolating shading for unshaded fragments based on adjacent shaded fragments in the memory.

7. The graphics processing system as claimed in claim 1, wherein the map manager further includes an edge detector to detect edges from an image.

8. A graphics processing system, comprising:
a graphics processor, the graphics processor generating a geometry-buffer (G-buffer) by performing a first pass of deferred shading; and
a memory to store the G-buffer,
wherein:
the graphics processor includes a shader and an interpolation filter,
the shader is to generate intermediate rendering data by shading fragments according to an initial fragment map that indicates fragments to be shaded among a plurality of fragments, generate final rendering data according to a second fragment map, and provide the intermediate rendering data and the final rendering data to the interpolation filter,
the interpolation filter is to generate a final image, including shaded pixels, by interpolating shading for unshaded pixels based on adjacent shaded pixels in the intermediate rendering data and the final rendering data received from the shader,
the graphics processor is to generate a first fragment map by adding or removing fragments to or from the initial fragment map based on the intermediate rendering data, and generate the second fragment map by adding or removing fragments to or from the first fragment map based on the G-buffer,
the shader is to shade fragments according to the second fragment map, and
unshaded fragments are identified according to the second fragment map.

9. The graphics processing system as claimed in claim 8, wherein the initial fragment map is generated according to edges detected from a depth image and/or a predefined pattern.

10. The graphics processing system as claimed in claim 8, wherein the shader is to shade fragments corresponding to edges detected from an image included in the G-buffer.

11. The graphics processing system as claimed in claim 8, wherein the shader is not to shade fragments corresponding to areas in which no edge is detected in all images included in the G-buffer.

12. The graphics processing system as claimed in claim 8, wherein the shader is to selectively shade fragments via pixel discarding.

13. The graphics processing system as claimed in claim 8, wherein the interpolation filter is to:
- overlap images included in the intermediate rendering data and the final rendering data; and
- interpolate shading for unshaded pixels based on adjacent shaded pixels in an overlapped image.

14. A graphics processing method, comprising:
- generating a geometry-buffer (G-buffer) by performing a first pass of deferred shading;
- generating intermediate rendering data by performing rendering according to an initial fragment map that indicates fragments to be shaded among a plurality of fragments;
- determining fragments to be interpolated based on the G-buffer and the intermediate rendering data as unshaded fragments; and
- interpolating shading for the unshaded fragments based on adjacent shaded fragments,
- wherein determining the fragments to be interpolated includes:
- generating a first fragment map by adding or removing fragments to or from the initial fragment map based on the intermediate rendering data,
- generating a second fragment map by adding or removing fragments to or from the first fragment map based on the G-buffer,
- shading fragments according to the second fragment map, and
- identifying the unshaded fragments according to the second fragment map.

15. The graphics processing method as claimed in claim 14, wherein generating the intermediate rendering data includes generating the initial fragment map according to edges detected from a depth image and/or according to a predefined pattern.

16. The graphics processing method as claimed in claim 14, wherein generating the first fragment map includes generating the initial fragment map based on edges detected from shaded fragments included in the intermediate rendering data.

17. The graphics processing method as claimed in claim 14, wherein generating the second fragment map includes:
- adding fragments corresponding to edges detected from an image included in the G-buffer to the second fragment map; and
- removing fragments in the first fragment map corresponding to areas from which no edge is detected in all images included in the G-buffer from the second fragment map.

18. The graphics processing method as claimed in claim 14, wherein:
- final rendering data is generated by shading fragments corresponding to edges detected from an image included in the G-buffer; and
- determining the fragments to be interpolated includes determining fragments corresponding to an area from which no edge is detected in all images included in the G-buffer.

* * * * *